US006550811B1

(12) United States Patent
Bennett et al.

(10) Patent No.: US 6,550,811 B1
(45) Date of Patent: Apr. 22, 2003

(54) DUAL FUEL TANK SYSTEM FOR AN EARTHMOVING VEHICLE

(76) Inventors: Timothy J. Bennett, 2607 Clearwater Ave., Bloomington, IL (US) 61704-2320; Shandy L. Hill, 311 E. Warren St., Moweaqua, IL (US) 62550-1328; Kevin J. Wilkening, 1584 E. North Port Rd., Decatur, IL (US) 62526-2824

( * ) Notice: Subject to any disclaimer, the term of this patent is extended or adjusted under 35 U.S.C. 154(b) by 0 days.

(21) Appl. No.: 09/608,900

(22) Filed: Jun. 30, 2000

(51) Int. Cl.[7] .................................................. B60P 3/22
(52) U.S. Cl. ....................... 280/833; 280/834; 180/314
(58) Field of Search .......................... 180/314; 280/833, 280/834; D12/218

(56) References Cited

U.S. PATENT DOCUMENTS 2,276,963 A * 3/1942 Griffin ........................ 280/833
2,445,275 A * 7/1948 Lintern et al. .............. 280/834
2,530,819 A * 11/1950 Hamlin ....................... 280/834
2,622,887 A * 12/1952 Prior .......................... 280/833
2,711,341 A 6/1955 Mills et al.
3,311,183 A 3/1967 Phillips
3,435,546 A 4/1969 Iverson
3,667,563 A 6/1972 Korb et al.
3,960,238 A * 6/1976 McClure et al.
3,984,141 A * 10/1976 Gilete et al.
4,149,733 A * 4/1979 Grooss ....................... 280/834
4,149,734 A * 4/1979 Sylvester .................... 280/834
4,288,086 A 9/1981 Oban et al.
4,355,509 A * 10/1982 Fulkerson et al.
4,383,590 A 5/1983 van der Lely
4,480,845 A 11/1984 Hansen
4,694,870 A * 9/1987 Vize
5,095,882 A * 3/1992 Christensen
5,384,172 A * 1/1995 Takado et al.
5,570,738 A * 11/1996 Christensen
5,738,380 A 4/1998 Zipser et al.
5,839,743 A * 11/1998 Weinkauf

FOREIGN PATENT DOCUMENTS

JP 403176235 7/1991
JP 3-197234 * 8/1991
JP 405016681 1/1993
JP 406001153 1/1994
JP 2001-304061 * 10/2001

* cited by examiner

*Primary Examiner*—Brian L. Johnson
*Assistant Examiner*—Bryan Fischmann
(74) *Attorney, Agent, or Firm*—August E Roehrig, Jr.; William B Heming

(57) ABSTRACT

A side mount fuel tank system installed on an earth moving vehicle such as a motor grader. The side mount fuel tank system is designed to allow the installation of an air-to-air aftercooler onto a motor grader without requiring the lengthening of a rear frame of the motor grader. The side mount fuel tank system includes a support apparatus and a fuel tank apparatus. The fuel tank system includes a first fuel tank attached to a first side of an engine compartment, and a second fuel tank attached to a second side of the engine compartment. Each of the fuel tanks includes tank plates positioned to deflect material impinging on the tanks.

11 Claims, 5 Drawing Sheets

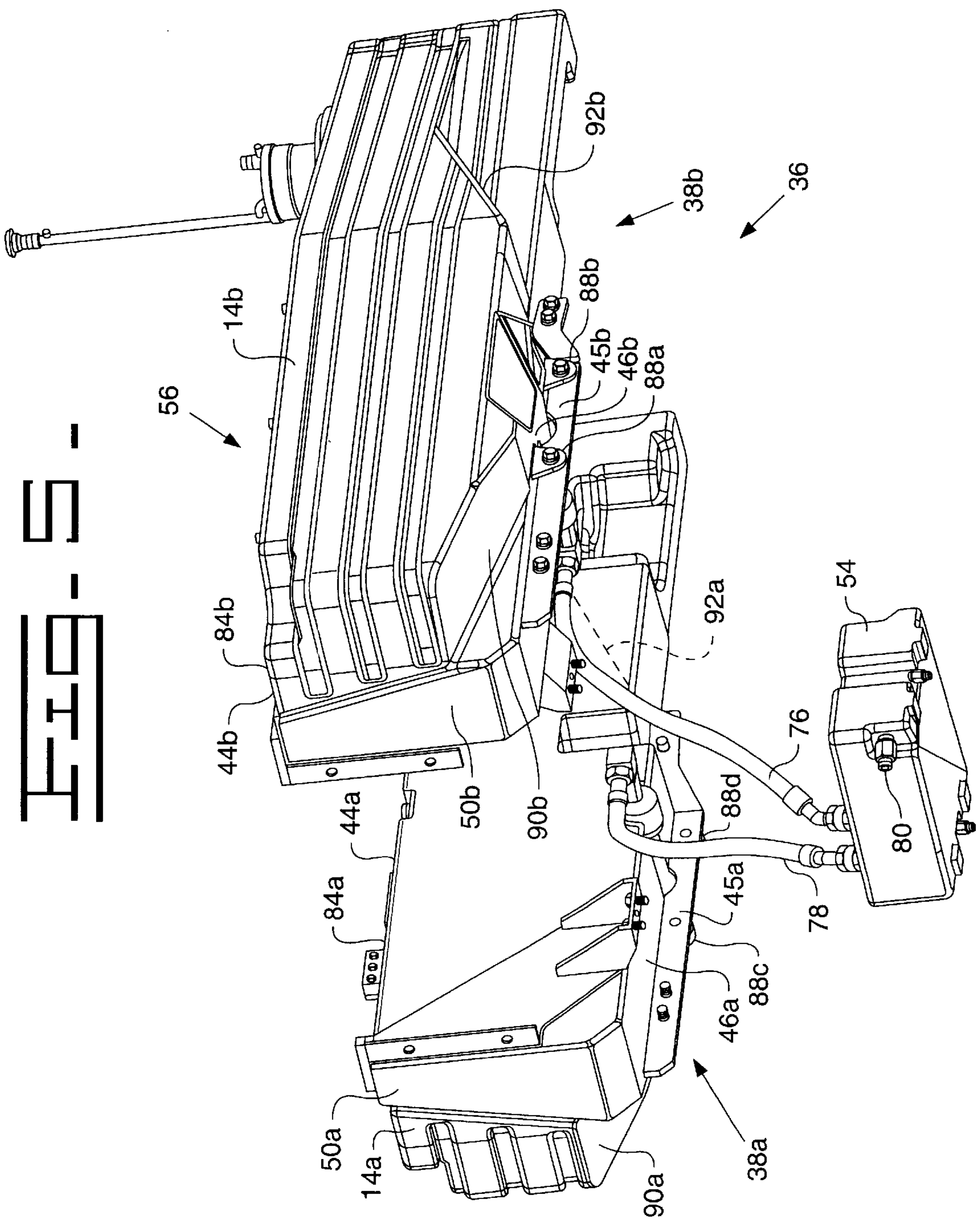
Fig-5-
56
14b
84b
44b
50b
90b
44a
84a
50a
14a
90a
38a
46a
88c
45a
88d
78
80
76
54
92a
88a
46b
45b
88b
38b
36
92b

DUAL FUEL TANK SYSTEM FOR AN EARTHMOVING VEHICLE

TECHNICAL FIELD

The present invention relates generally to fuel tank systems, and more particularly to a motor grader side mount fuel tank system. The motor grader side mount fuel tank system is designed to allow the installation of an air-to-air aftercooler onto a motor grader without requiring the lengthening of a rear frame of the motor grader.

BACKGROUND ART

In the past, a rear frame was lengthened in order to accommodate additional equipment or fuel capacity on a motor grader. The lengthened rear frame required additional reinforcements to prevent additional frame flex. A ripper assembly would also have to be redesigned to accommodate the lengthened frame. Weight distribution is critical on the motor grader, so that lengthening the rear frame and adding additional equipment, such as an air-to-air aftercooler, would add weight behind a rear axle. In addition, moving equipment such as the ripper assembly further rearward reduces its effectiveness in accomplishing its intended purpose. Adding additional weight behind the rear axle would require more counterweights at the front, and would increase the overall weight of the motor grader.

The present invention is directed to overcoming one or more of the problems or disadvantages associated with the prior art.

DISCLOSURE OF THE INVENTION

In one aspect of the present invention, a side mount fuel tank system is provided for an earth moving vehicle such as a motor grader. The side mount fuel tank system includes a support apparatus and a fuel tank apparatus. The fuel tank apparatus includes a first fuel tank, a second fuel tank, and a fuel sump tank.

The fuel tank system has a first mounting structure attached to a first side of a vehicle, a second mounting structure attached to a second side of the vehicle, a first fuel tank attached to the first mounting structure, a second fuel tank attached to the second mounting structure, and a fuel filler apparatus for filling the first fuel tank and the second fuel tank with fuel.

A motor grader incorporating the invention would include a rear frame with a plurality of wheels attached to the rear frame, an engine compartment attached to the rear frame, and a side mount fuel tank system attached to the rear frame which includes a first fuel tank positioned along a first side of the engine compartment and above the plurality of wheels, and a second fuel tank positioned along a second side of the engine compartment and above the plurality of wheels.

BRIEF DESCRIPTION OF THE DRAWINGS

The preferred embodiments of this invention will be described in detail, with reference to the following figures, wherein like designations denote like elements, and wherein:

FIG. 5 is a bottom perspective view of the fuel tank apparatus attached to the support apparatus.

BEST MODE FOR CARRYING OUT THE INVENTION

The foregoing and other features and advantages of the invention will be apparent from the following more particular description of preferred embodiments of the invention.

Although certain preferred embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of the preferred embodiment. Although the drawings are intended to illustrate the present invention, the drawings are not necessarily drawn to scale.

Figure 1:
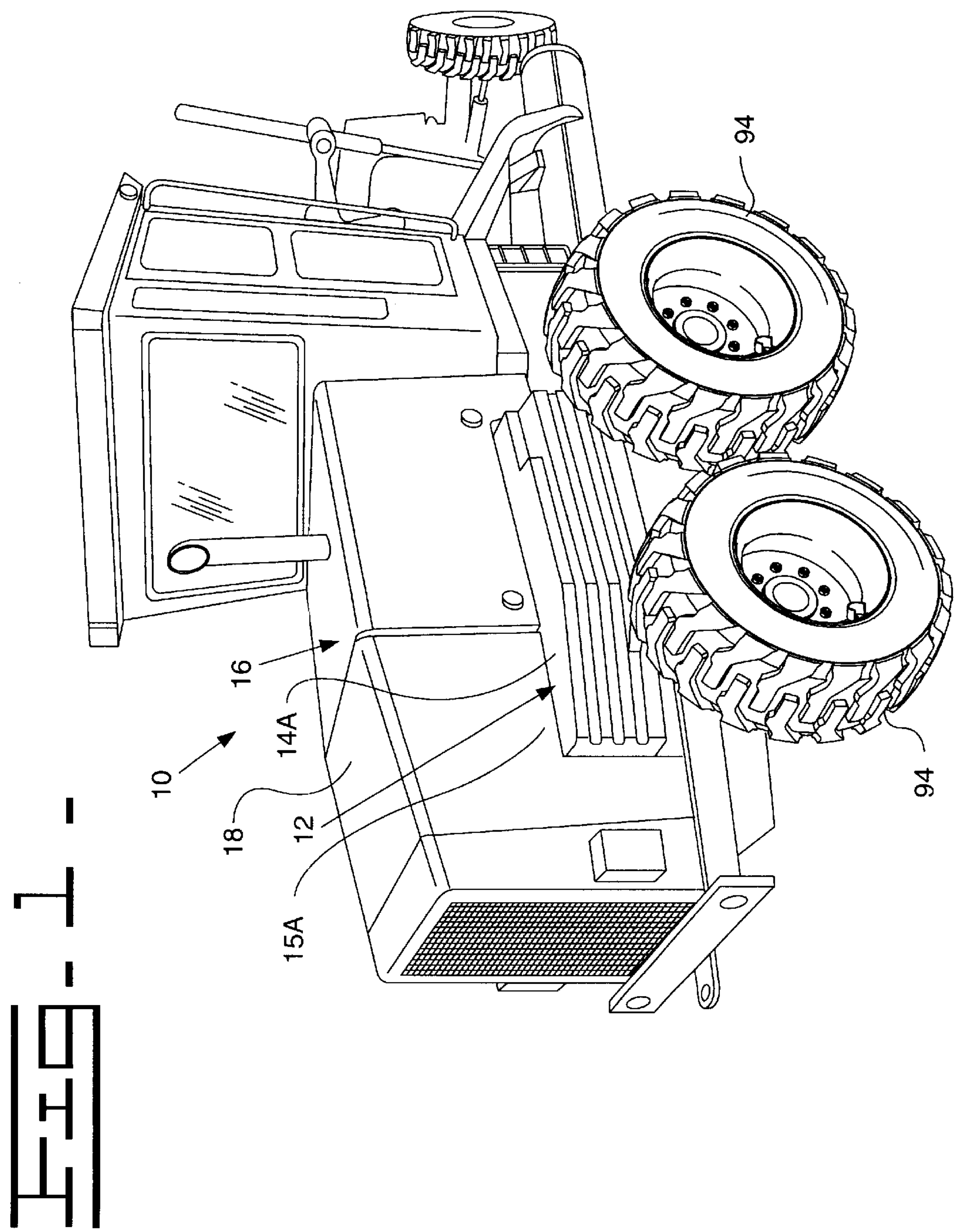
FIG. 1 is a perspective view of a motor grader including a side mount fuel tank system.

Referring to FIG. 1, a perspective view of an earth moving vehicle, such as a motor grader 10, including a side mount fuel tank system 12 is shown. A first fuel tank 14A and a second fuel tank 14B (FIG. 2) are positioned on a first side 15A and a second side 15B, respectively, of an engine compartment 16.

Figure 2:
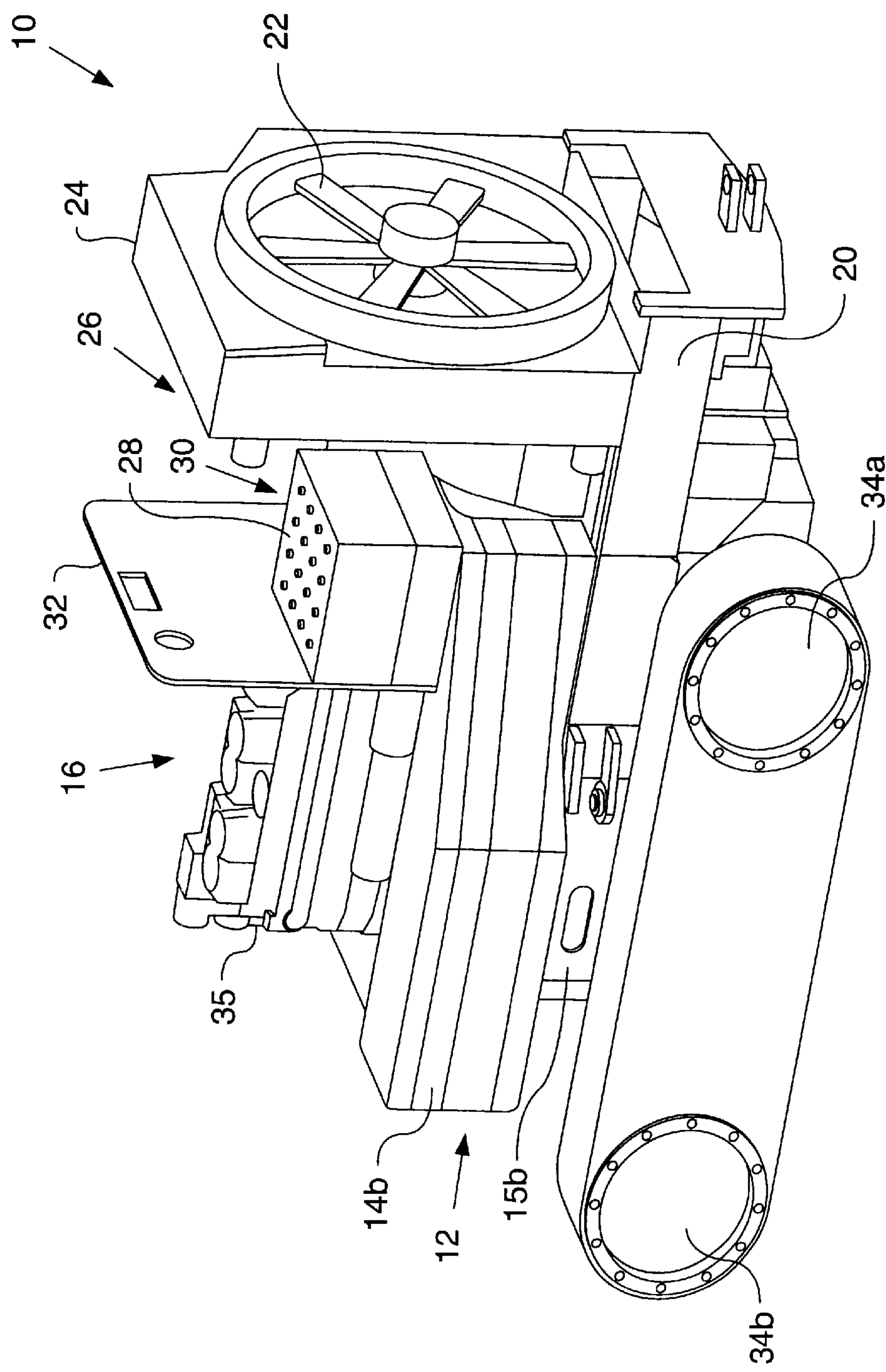
FIG. 2 is a perspective view of the side mount fuel tank system with a hood of the motor grader removed.

FIG. 2 illustrates a perspective view of the motor grader 10, with a hood assembly 18 (FIG. 1) removed from the engine compartment 16. FIG. 2 illustrates a rear frame 20 of the motor grader 10. A fan apparatus 22, a radiator 24, an air-to-air aftercooler 26, a battery assembly 28, an air tank 30, a partition 32, an engine 35, and the side mount fuel tank system 12 are attached to the rear frame 20. The second fuel tank 14B and first fuel tank 14A (FIG. 1) of the side mount fuel tank system 12 are positioned above the wheels 34A and 34B.

Figure 3:
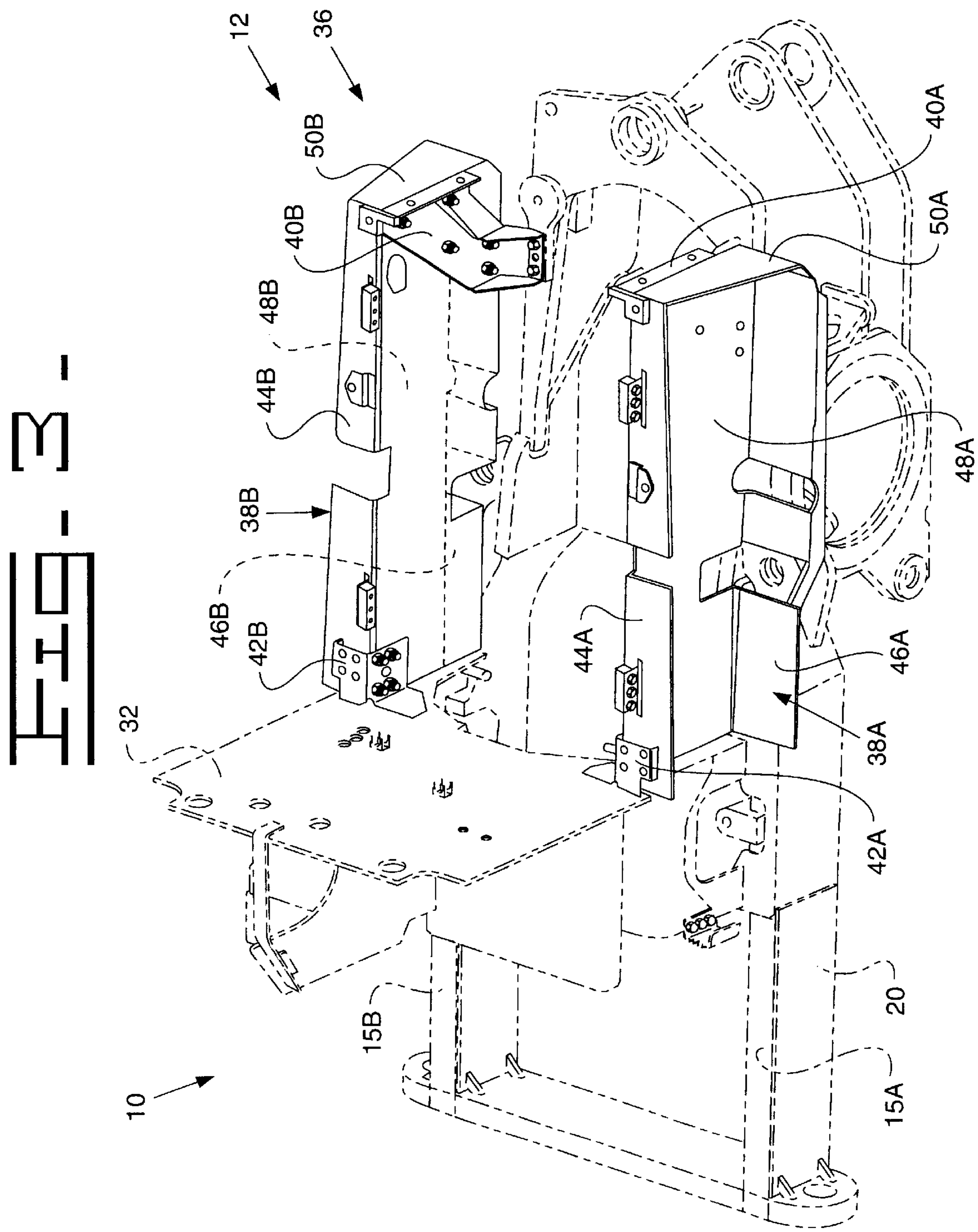
FIG. 3 is a perspective view of a support apparatus attached to a rear frame of the motor grader.

FIG. 3 illustrates a perspective view of the rear frame 20 of the motor grader 10, including a support apparatus 36 of the side mount fuel tank system 12. The support apparatus 36 includes a first mounting structure 38A, a second mounting structure 38B, a bracket 40A, a bracket 40B, a bracket 42A, and a bracket 42B. The bracket 40A and the bracket 42A attach the first mounting structure 38A to the rear frame 20. The bracket 40B and the bracket 42B attach the second mounting structure 38B to the rear frame 20. The first mounting structure 38A includes an upper plate 44A, a lower plate 46A, a vertical plate 48A, and an end plate 50A. The vertical plate 48A joins the upper plate 44A with the lower plate 46A. The end plate 50A attaches to the upper plate 44A, the vertical plate 48A, and the lower plate 46A. The second mounting structure 38B includes an upper plate 44B, a lower plate 46B, a vertical plate 48B, and an end plate SOB. The vertical plate 48B joins the upper plate 44B with the lower plate 46B. The end plate 50B attaches to the upper plate 44B, the vertical plate 48B, and the lower plate 46B.

Figure 4:
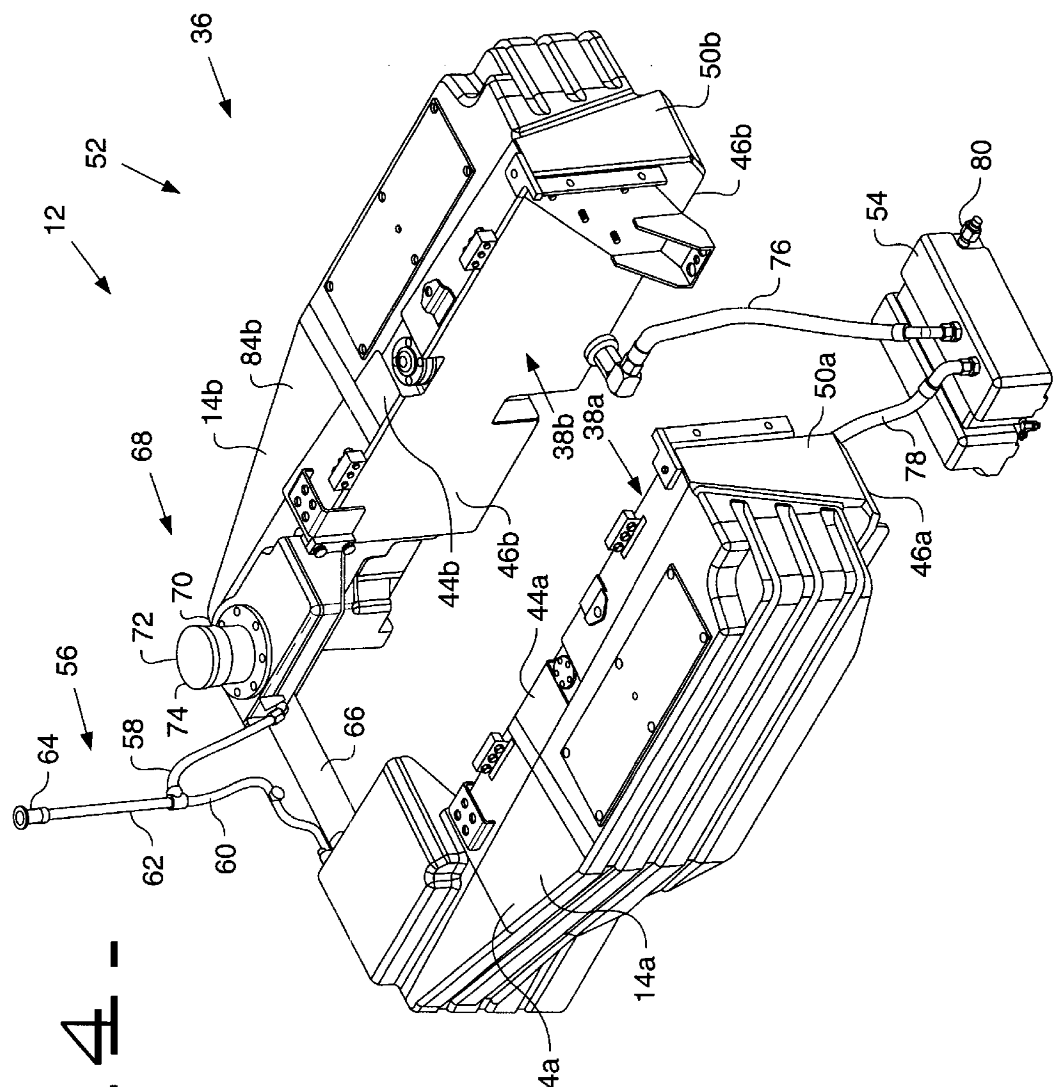
FIG. 4 is a top perspective view of a fuel tank apparatus attached to the support apparatus.

FIG. 4 illustrates a top perspective view of the side mount fuel tank system 12. The side mount fuel tank system 12 includes the support apparatus 36 and a fuel tank apparatus 52. The fuel tank apparatus 52 includes the first fuel tank 14A, the second fuel tank 14B, and a fuel sump tank 54. A vent apparatus 56 includes a conduit 58, a conduit 60, and a conduit 62. The conduit 58 connects the second fuel tank 14B with the conduit 62. The conduit 60 connects the first fuel tank 14A with the conduit 62. Fuel vapor exits the second fuel tank 14B through the conduit 58, and fuel vapor exits the first fuel tank 14A through the conduit 60. Fuel vapor from the conduit 62 exits through the port 64. A fuel cross-over conduit 66 connects the first fuel tank 14A with the second fuel tank 14B. The fuel cross-over conduit 66 allows fuel to flow between the first fuel tank 14A and the second fuel tank 14B. The fuel cross-over conduit 66 allows the fuel level to equalize between the first fuel tank 14A and the second fuel tank 14B. A fuel filler apparatus 68 includes a filler spout 70 and a filler cap 72. The filler spout 70 is attached to the second fuel tank 14B, and allows fuel to enter the second fuel tank 14B from a fuel source (not shown). Fuel entering the second fuel tank 14B may also fill the first fuel tank 14A by flowing through the cross-over conduit 66. The filler cap 72 covers and uncovers an opening 74 in the filler spout 70.

A conduit 76 connects the second fuel tank 14B with the fuel sump tank 54. A conduit 78 connects the first fuel tank 14A with the fuel sump tank 54. Fuel flows from the second fuel tank 14B through the conduit 76 to the fuel sump tank 54. Fuel flows from the first fuel tank 14A through the conduit 78 to the fuel sump tank 54. Fuel exits the fuel sump tank 54 through the port 80.

As illustrated in FIGS. 4 and 5, the first fuel tank 14A rests upon the lower plate 46A of the first mounting structure 38A. The upper plate 44A of the first mounting structure 38A contacts an upper surface 84A of the first fuel tank 14A. The upper surface 84A of the first fuel tank 14A is fastened to the upper plate 44A by any suitable fastening system 86A (e.g., clamps, straps, etc.). The second fuel tank 14B rests upon the lower plate 46B of the second mounting structure 38B. The upper plate 44B of the second mounting structure 38B contacts an upper surface 84B of the second fuel tank 14B. The upper surface 84B of the second fuel tank 14B is fastened to the upper plate 44B by any suitable fastening system 86B (e.g., clamps, straps, etc.).

FIG. 5 illustrates a bottom perspective view of the fuel tank apparatus 52 attached to the support apparatus 36. The second fuel tank 14B attaches to a flange 45B of the lower plate 46B of the second mounting structure 38B by a threaded fastener 88A and by a threaded fastener 88B, wherein threaded fasteners 88A, 88B are preferably bolts. The first fuel tank 14A attaches to a flange 45A of the lower plate 46A of the first mounting structure 38A by a threaded fastener 88C and by a threaded fastener 88D.

The first fuel tank 14A includes a rear tank plate 90A and a forward tank plate 92A. The second fuel tank 14B includes a rear tank plate 90B and a forward tank plate 92B. The rear plate 90B and the forward plate 92B are attached at an angle (FIG. 5) to the lower plate 46B, and are designed to protect the second fuel tank 14B from being damaged by deflecting rocks, tire chains, or other materials that may be flung upward from a plurality of tires 94 (FIG. 1). The rear plate 90A and the forward plate 92A are attached at an angle (FIG. 5) to the lower plate 46A. These plates are similarly designed and positioned to protect the first fuel tank 14A from being damaged by rocks, tire chains, or other material that may be flung upward from the tires 94 of the motor grader 10.

The first fuel tank 14A, the second fuel tank 14B and the fuel sump tank 54 are made from any suitable puncture resistant and spark resistant material (e.g., plastic, polyethylene, composite fiber, fiberglass, etc.). The first mounting structure 38A and the second mounting structure 38B are made from any suitable material (e.g., steel, aluminum, etc.). The side mount fuel tank system 12 allows the installation of the air-to-air aftercooler 26 without having to extend the rear frame 20 of the motor grader 10. The side mount fuel tank system 12 moves the previous fuel tank location from behind the engine compartment 16 to the sides of the engine compartment 16. This movement moves the center of gravity of the fuel and the first fuel tank 14A and the second fuel tank 14B from behind the rear axle to a forward location. This improves the weight distribution of the motor grader 10. The side mount fuel tank system 12 includes a low fuel filler spout 70 that allows an operator to fill the first fuel tank 14A and the second fuel tank 14B from the ground level. Previously, the fuel filler spout was at the top of the engine enclosure, and required the operator to climb up on the motor grader 10 to fill the tank with fuel. The side mount fuel tank system 12 provides increased fuel capacity without the need to lengthen the motor grader 10 rear frame 20. Additionally, the side mount fuel tank system 12 increases the area ahead of the air-to-air aftercooler 26 and radiator 24, allowing improved ambient air movement within the engine compartment 16. This improves the cooling of the engine and the air-to-air aftercooler 26.

Industrial Applicability

Those skilled in the art will appreciate that the side mount fuel tank system 12 described above is intended to be installed on any suitable vehicle (motor grader, wheel loader, etc.). The side mount fuel tank system 12 allows additional equipment such as an air-to-air-aftercooler 26, to be installed in an engine compartment 16, without requiring the lengthening of a rear frame 20 of the vehicle.

The side mount fuel tank system 12 moves the previous fuel tank location from behind an engine compartment 16 to the sides of the engine compartment 16. This movement moves the center of gravity of the fuel and fuel tank from behind the rear axle to a forward location. This improves the weight distribution of the motor grader 10. The side mount fuel tank system 12 includes a low fuel filler spout 70 that allows an operator to fill the fuel tanks (14A,14B) from ground level. Previously, the fuel filling opening was at the top of the engine compartment 16, and required the operator to climb up onto the motor grader 10 to fill the tanks with fuel.

The side mount fuel tank system 12 also provides increased fuel capacity without the need to lengthen the motor grader 10 rear frame 20. Additionally, the side mount fuel tank system 12 increases the area ahead of the air-to-air aftercooler 26 and radiator 24, allowing improved ambient air movement within the engine compartment 16. This improves the cooling of the engine 35 and the air-to-air aftercooler 26.

Other aspects and features of the present invention can be obtained from a study of the drawings, the disclosure, and the appended claims.

What is claimed is:

1. A side mount fuel tank system for a motor grader having a support apparatus including a first mounting structure provided on a first side of a motor grader frame and a second mounting structure provided on a second side of a motor grader frame, said side mount fuel tank system comprising:

- a first and second vertical plate each being attached to a respective one of said first and second sides of said machine frame;
- a first and second lower plate each having a downwardly extending flange and joining a respective one of said first and second vertical plates, said lower plates extending a predetermined distance outward from said machine frame;

- a first and second upper plate each joining a respective one of said first and second vertical plates, each of said first and second upper plates extending outward from said machine frame;
- a first and second opening each being defined between respective ones of said first and second upper plates and said first and second lower plates at a location outward from said vertical plates;
- a first and second fuel tank each positioned in a respective one of said first and second openings and resting upon its associated lower plate;
- fasteners adapted to attach a respective one of said first and second fuel tanks to said support apparatus, at least one fastener attaching a respective one of the first and second fuel tanks to the flange of the respective lower plate with which it is associated.

2. The side mount fuel tank system of claim 1, further including:

- a cross-over conduit for allowing fuel to pass between the first fuel tank and the second fuel tank; and
- a fuel sump tank connected to the first fuel tank and the second fuel tank for removing fuel from the first fuel tank and from the second fuel tank.

3. The side mount fuel tank system of claim 1 wherein the first and second fuel tanks each have an upper surface, each of said upper surfaces being fastened to and in contact with the respective upper plate with which it is associated.

4. A motor grader having a front frame and a rear frame attached to the front frame, an engine compartment and a side mount fuel tank system having a support apparatus and being attached to the rear frame, said motor grader comprising:

- a first and second vertical plate each being attached to a respective one of said first and second sides of said rear frame;
- a first and second lower plate each joining a respective one of said first and second vertical plates and said first and second lower plates, extending a predetermined distance outward from said frame;
- a first and second upper plate each joining a respective one of said vertical plates, each of said upper plates extending outward from said rear frame;
- a first and second opening each being defined between respective ones of said first and second upper plates and said first and second lower plates at a location outward from said vertical plates;
- a first and second fuel tank each positioned in a respective one of said first and second openings; and
- a first and second fastener each adapted to attach a respective one of said first and second fuel tanks to said support apparatus.

5. The motor grader of claim 4, wherein the engine compartment further includes:

- an air-to-air aftercooler attached to the rear frame;
- a radiator attached to the rear frame;
- a battery attached to the rear frame;
- an air tank attached to the rear frame; and
- a fan apparatus attached to the rear frame.

6. The motor grader of claim 4, further including a first pair of tank plates positioned for preventing impact damage to said first fuel tank, and a second pair of tank plates positioned for preventing impact damage to said second fuel tank.

7. The motor grader of claim 4, further including a fuel filler apparatus for filling the first fuel tank and the second fuel tank with fuel.

8. The motor grader of claim 4, further including a cross-over conduit for allowing fuel to pass between the first fuel tank and the second fuel tank.

9. The motor grader of claim 4, further including a fuel sump tank connected to the first fuel tank and the second fuel tank for removing fuel from the first fuel tank and from the second fuel tank.

10. The motor grader of claim 4, wherein each fuel tank is made from an impact resistant material.

11. The motor grader of claim 4, further including a vent apparatus for allowing fuel vapor to exit each fuel tank.

* * * * *

UNITED STATES PATENT AND TRADEMARK OFFICE

CERTIFICATE OF CORRECTION

PATENT NO. : 6,550,811 B1
DATED : April 22, 2003
INVENTOR(S) : Timothy J. Bennett et al.

It is certified that error appears in the above-identified patent and that said Letters Patent is hereby corrected as shown below:

Title page,
Should have the following included:

-- [73] Assignee: Caterpillar Inc., Peoria, Ill. --

Signed and Sealed this

Twenty-second Day of July, 2003

JAMES E. ROGAN
*Director of the United States Patent and Trademark Office*